(12) United States Patent
Waldrep

(10) Patent No.: US 6,373,030 B1
(45) Date of Patent: Apr. 16, 2002

(54) LOW TEMPERATURE PORTABLE OVEN

(76) Inventor: Linnes M. Waldrep, Rte. 5, Box 117, Decatur, AL (US) 35603

( * ) Notice: Subject to any disclaimer, the term of this patent is extended or adjusted under 35 U.S.C. 154(b) by 0 days.

(21) Appl. No.: 08/459,301

(22) Filed: Jun. 5, 1995

(51) Int. Cl.⁷ .............................. A21B 1/14; A21B 1/22; A21B 2/00; A47J 37/06
(52) U.S. Cl. ...................... 219/411; 392/416
(58) Field of Search .................. 219/385, 386, 219/387, 214, 405, 411; 392/411, 416, 418; 432/225; 99/389

(56) References Cited

U.S. PATENT DOCUMENTS

| | | | | |
|---|---|---|---|---|
| 2,056,156 A | * | 10/1936 | Buckingham et al. | 219/394 |
| 2,549,619 A | * | 4/1951 | Miskella | 219/388 |
| 2,559,249 A | * | 7/1951 | Hudson | 219/411 |
| 2,767,279 A | * | 10/1956 | Benson | 219/411 |
| 2,864,932 A | * | 12/1958 | Forrer | 219/405 |
| 3,789,233 A | * | 1/1974 | Bumpus et al. | 392/416 |
| 4,398,083 A | * | 8/1983 | Mack | 392/411 |
| 4,481,405 A | * | 11/1984 | Malick | 219/405 |
| 4,675,506 A | * | 6/1987 | Nusbaum et al. | 219/405 |
| 4,733,054 A | * | 3/1988 | Paul | 219/411 |
| 4,771,154 A | * | 9/1988 | Bell et al. | 219/405 |
| 4,960,977 A | * | 10/1990 | Alden | 219/388 |
| 5,375,511 A | * | 12/1994 | Huie et al. | 219/386 |

FOREIGN PATENT DOCUMENTS

GB 2156509 * 10/1985 .................. 99/483

\* cited by examiner

*Primary Examiner*—Joseph Pelham
(74) *Attorney, Agent, or Firm*—Waddey & Patterson, PC; John C. Garvin, Jr.

(57) ABSTRACT

A portable cooking oven utilizes heat lamps to provide a low temperature slow cooking system. Independently operated dimmer control switches provide temperature control by controlling the power supplied to selected heat lamps.

2 Claims, 3 Drawing Sheets

LOW TEMPERATURE PORTABLE OVEN

BACKGROUND OF THE INVENTION

1. Field of the Invention

The present invention relates generally to portable cooking ovens which utilize electrical lamps as a heat source, and more specifically to such ovens which are utilized for low temperature cooking, which include infinitely controllable temperatures within a given temperature range and wherein the temperature of selected lamps may be independently controlled.

2. Description of the Prior Art

The use of electrical lamps as a heat source for warming and cooking food is well known. However, little has been accomplished in the way of utilizing the potential of this very effective and low cost method of cooking. It is well known that low temperature cooking has many advantages over high temperature cooking, not the least of which is the fact that high temperature electric ovens require the use of a 220 volt power supply. Conversely, electric lamps typically operate with a conventional 110V power supply, can be purchased at very low cost and with relatively large heat outputs. It follows that such lamps provide an ideal medium for specific cooking needs. Examples of such needs include outdoor cooking wherein cost convenience and portability are of paramount importance. Within this category, cooking while camping is becoming an art form rather than simply a necessary chore. The present invention provides the ultimate in convenience and utility for all such cooking needs. In addition, the present invention provides a low temperature cooking oven which produces delicious results with the cooking of a great variety of foods such as roasts or full course meals. The cost of electric lamps and other building materials required for manufacture of the device is very low, as is the cost of the 110V electricity with which it operates. Accordingly, it is clear that the present invention is very economical to build and to operate.

The following are U.S. patents which relate generally to the present invention: U.S. Pat. No. 2,504,516 to Goodel; U.S. Pat. No. 2,549,619 to Miskella; U.S. Pat. No. 2,559,249 to Hudson; U.S. Pat. No. 2,767,297 to Benson; U.S. Pat. No. 2,864,932 to Forrer; U.S. Pat. No. 2,575,616 to Bergendal; and U.S. Pat. No. 4,733,054 to Paul. The Goodel patent, titled "ELECTRICALLY HEATED OVEN", relates to an oven which includes specifically designed ducts for cooling the electrical wires which supply power to the heating elements of the oven. The Miskella patent, titled "INFRARED OVEN", is directed to a food conveyer system which passes through the oven and which operates in conjunction with an air circulation-system. The Hudson patent, titled "INFRARED OVEN STRUCTURE", discloses an interior arrangement and configuration of panels which support infrared lamps within the oven. The Benson patent, titled "RADIANT ENERGY OVEN", teaches use of a specific interior configuration for use in a quick acting, high temperature oven. The Forrer patent, titled "INFRARED COOKING OVEN", discloses an arrangement of a food shelf for primary heat by radiation independent of heat from air circulated within the oven. The patent to Bergendal, titled "DOMESTIC INFRA-RED RADIATION OVEN", relates to optimizing infrared wave length and to specific sizing and location of the infrared sources. The patent to Paul, titled "HOT FOOD STAND", teaches the use of a food warmer which is actuated by placing food on a tray positioned beneath heating lamps.

It will be readily appreciated that the while the above described patents relate to the present invention in that the patents utilize heat lamps of various types for cooking and warming food none of the patents in any way suggests the invention described herein.

SUMMARY OF THE INVENTION

In view of the foregoing it is clear that a need exists for a portable low temperature oven which may be economically manufactured and which may be operated by conventional 110 volt electrical power. The present invention provides an oven which effectively provides such an oven. In addition the present invention provides state of the art insulation, which is not only an effective insulator, but is also light in weight.

To provide such an oven, the present invention includes a rectangular housing constructed of a dual purpose laminated insulating panels. The material consists of a rigid heat resistant insulation material sandwiched between layers of a hard shell material such as aluminum. The housing is provided with an opening for a hinged door which is also constructed of laminated insulating panels. Within the housing a plurality of electric lamps are attached to threaded electrical fixtures. An electrical circuit provides power to the fixtures and lamps when attached to a conventional 110 volt electrical power supply. The circuits include a pair of dimmer switch controls which may be adjusted infinitely between an off position and a predetermined maximum power supplied to the lamps. These controls are attached to selected of the lamps and serve to provide the desired cooking temperature within selected areas of the oven in accordance with the location of the lamps. Typically, an oven is provided with four heating lamps. A single lamp is attached to each side wall of the housing and two lamps are attached to the top of the housing. By circuitry arrangement each of the control switches is attached to a side mounted lamp and to a top lamp which is positioned adjacent the opposite wall. In this way each control switch controls diagonally opposing lamps. This provides the user with the ability to control the cooking temperature to selected portions of the food being cooked without the danger of over cooking any isolated portion.

DESCRIPTION OF THE PREFERRED EMBODIMENTS

Figure 4:
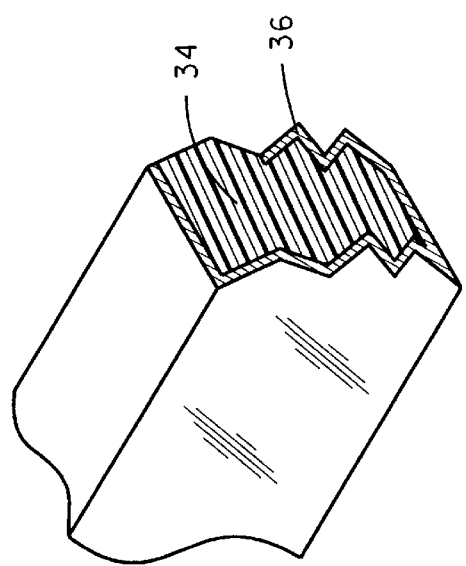
FIG. 4 is a sample portion taken from the front of the oven and illustrating the construction of the insulated panels which make up the housing of the invention.
Figure 1:
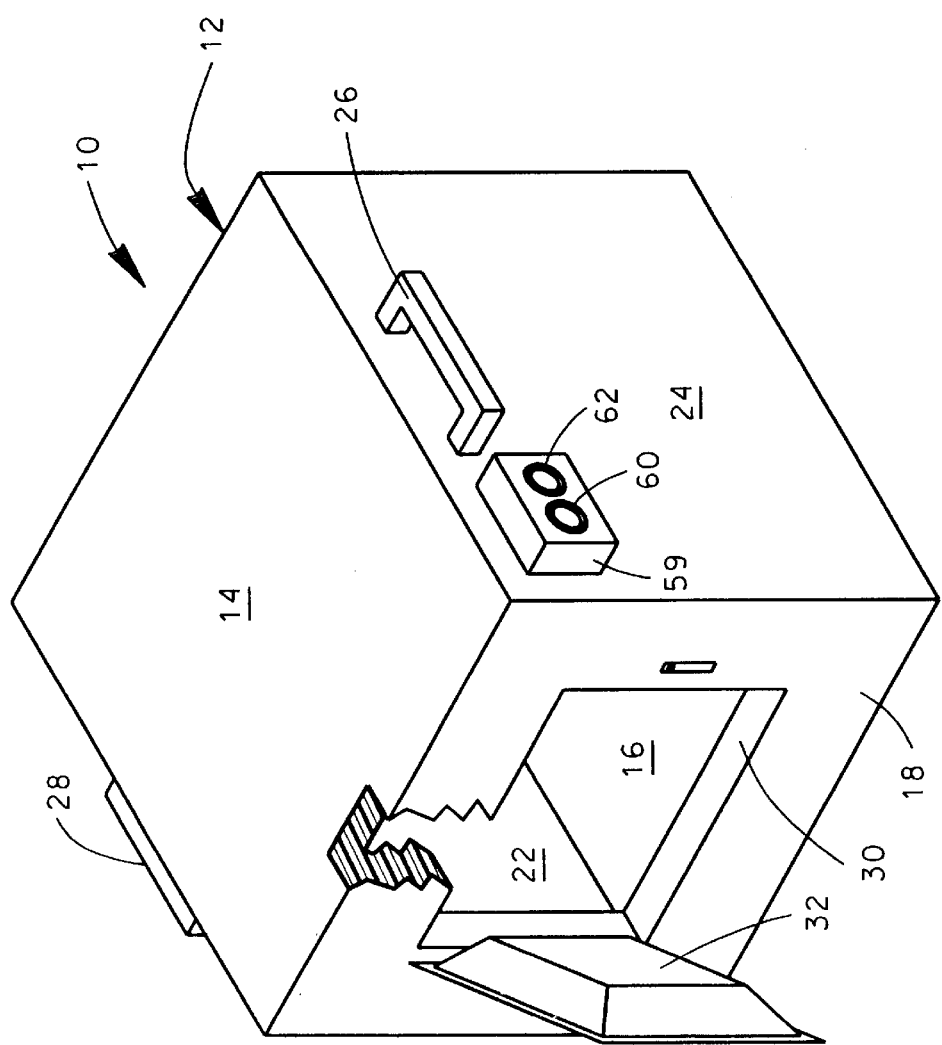
FIG. 1 is a perspective view of the low temperature oven comprising the present invention.
Figure 2:
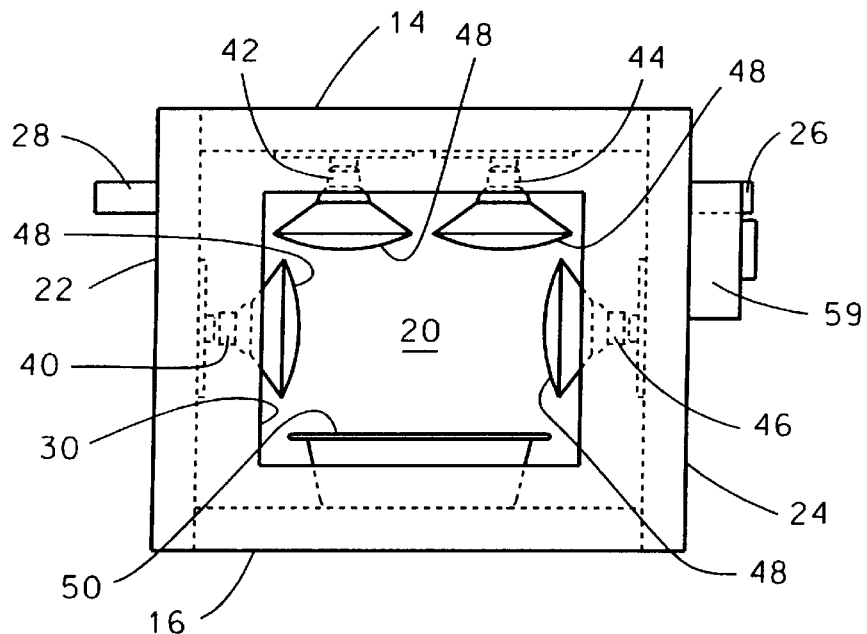
FIG. 2 is a front view of the oven taken with the door removed for clarity and illustrating a cooking pan positioned within the oven.
Figure 3:
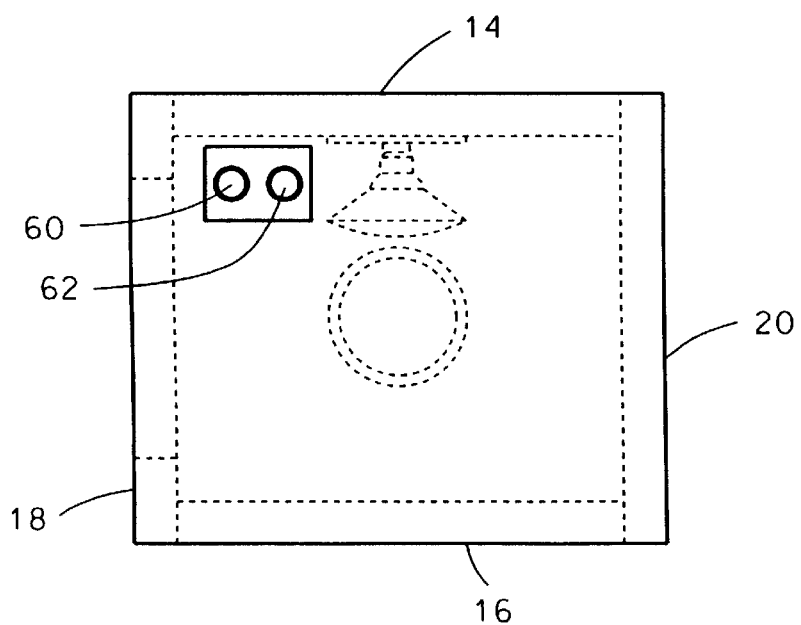
FIG. 3 is a side view of the oven illustrating the side which includes the oven controls.
Figure 5:
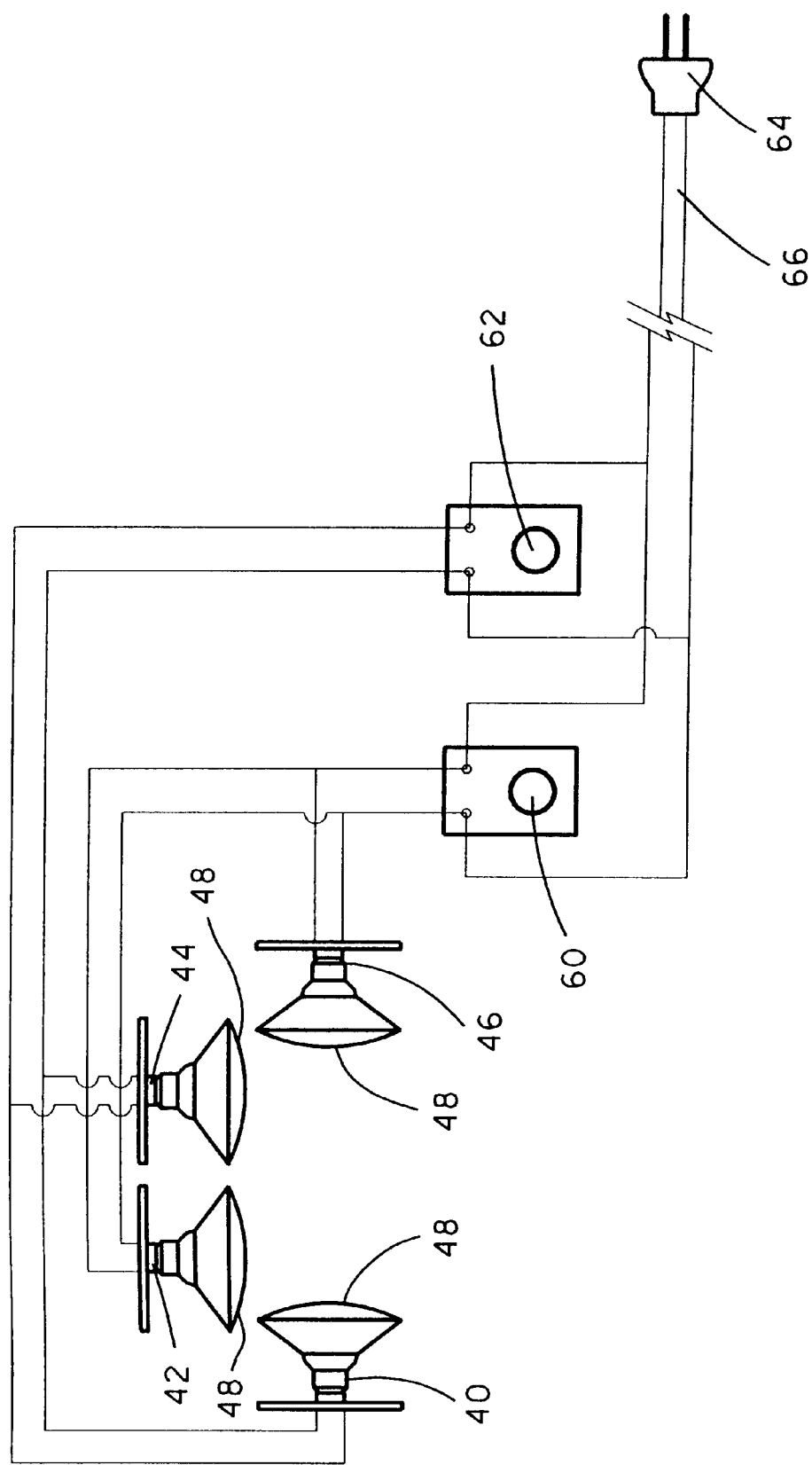
FIG. 5 is a schematic of the electrical circuit of the invention.

Referring now to the drawings, reference is made in particular to FIG. 1 wherein the oven which is the subject of the invention is indicated generally by the numeral 10. The oven 10 is primarily defined by a housing 12 which includes a top 14, a bottom 16, a front 18, a back 20 (best illustrated in FIG. 3), a first side 22, and a second side 24. It will be noted that the first and second sides, 22 and 24 respectively, are identified as being the left and right sides respectively of the housing 12 when viewed from the front. Handles 26, 28, are attached one to each of the sides 22, 24 to provide a convenient means for carrying the oven. The front 18 includes an opening 30 which provides access to the interior of the housing 12. A door 32 is pivotally attached to the front 18 for selectively opening or closing the opening 30. Any conventional means can be provided to hold or lock door 32 in a closed position. This means might be one or more spring loaded latches carried by door 32 which engage apertures in the front 18 of the oven 10, spring means which provide a friction fit between the door 32 and the opening 30, a lock placed in door 32 for engaging the walls of an aperture in the opening 30, or simple cooperating latch means provided on the outside of door 32 and the front 18 of oven 10. As illustrated in FIG. 4 the housing is constructed of laminated panels which are formed of a rigid insulating material 34 which is surrounded by a protective covering 36. It has been found that effective panels may be constructed of a two inch insulating fiberglass board #6 density, surrounded by 0.032" aluminum stucco embossed flat sheets. Referring now to FIG. 2, the interior of the housing 12 is provided with a first light fixture 40, a second light fixture 42 a third light fixture 44 and a fourth light fixture 46. For safe operation of the oven 10 heat resistant fixtures and heat resistant interior wires are required. Fixtures suitable for this application are available from Eagle Electric Mfg. CO. of Long Island City, N.Y. and are identified by Mfg. number 610. Heat resistant wiring is an over the counter item available from any well stocked electrical supply outlet. Utilization of these common sense precautions provides a device which is exceedingly safe in operation. It is thus obvious that the present invention provides the simplicity and safety of use as is enjoyed by the use of any common electrical lamp. As is well known, such lamps produce heat by convection rather than by infrared radiation such as is produced by several of the prior art patents cited supra. An electric heat lamp 48 is threadedly attached to each of the light fixtures. Heat lamps 48 are directed toward a cooking pan 50 which is typically utilized to contain the food to be cooked. It has been found that conventional heat lamps in the 200 to 300 watt range are most effective for cooking in this four lamp oven. If time permits the cooking process may be accomplished with the use of only two of the four lamps. As will be pointed out in detail hereinafter the heat lamps 48 of the oven 10 are positioned for effective cooking when using either two or four of the lamps. More specifically, during a cooking situation wherein two bulbs are lighted, the lighted bulbs are laterally spaced and angularly disposed from one another so as to provide maximum dispersal of the heat rays emitted by the lighted bulbs. FIG. 5 of the drawings illustrates an electrical circuit which supplies power from a conventional 110 volt power source to the electrical fixtures 40, 42, 44, and 46. Electrical dimmer switches 60 and 62 provide control of electrical power to selected fixtures. The electrical dimmer switches 60,62 are of conventional design and are readily available in electrical retail stores. The switches 60,62 are mounted within a switch box 59 which is attached to side 24 of housing 12. As shown in the schematic of the electrical circuit, each of the dimmer switches 60, 62 receives electrical power from a conventional 110 volt power supply through plug 64 and a connecting power cord 66. It will be noted that each of the fixtures is connected to the power cord through one of the dimmer switches 60,62. With the illustrated circuitry the fixtures 40 and 44 are controlled by dimmer switch 62, while fixtures 42 and 46 are controlled by dimmer switch 60. It is significant to note that this arrangement provides power control to heat lamps which are positioned diagonally from one another. Stated another way, as indicated above and in the drawings, in any cooking situation the lighted bulbs are laterally spaced and angularly disposed from one another so as to provide maximum dispersal of the heat rays emitted by the lighted bulbs. This arrangement provides the capability of providing heat where needed while preventing a major unbalance of heat within the oven. Thus, as mentioned above the cooking process may be accomplished by use of either two or four heat lamps. This feature is also particularly useful when the item being cooked is of an unusual shape, such as a long and narrow roast.

Having described the preferred embodiment of my invention, numerous changes to its construction and operation may become apparent to those skilled in the art and may be made without departing from the spirit and scope of my invention, and I therefore desire to be limited only by the scope of the appended claims.

I claim:

1. A portable low temperature cooking oven comprising:

a generally rectangular housing having a front panel, a rear panel, a first wall, a second wall, a top portion, and a floor; said front panel having an opening therein; a door pivotally attached to said front panel and disposed for selective closing of said opening; a first electrical fixture, a second electrical fixture, a third electrical fixture and a fourth electrical fixture attached within said housing; said first electrical fixture attached to said first wall, said second electrical fixture attached to said top portion adjacent said first wall, said third electrical fixture attached to said top portion adjacent said second wall and said fourth electrical fixture attached to said second wall; electrical heat lamps attached to each of said electrical fixtures; first and second dimming switches; electrical circuit means connecting each said dimming switch to an electrical power supply; said electric circuit means further electrically connecting said first dimming switch to said first electrical fixture and to said third electrical fixture and further connecting said second dimming switch to said second electrical fixture and to said fourth electrical fixture for independent control of said first and third electrical fixtures relative to control of said second and fourth electrical fixtures.

2. A portable low temperature cooking oven comprising: a housing constructed of laminated insulating panels having an opening therein; a door constructed of laminated insulating panels pivotally attached to said housing and disposed for selective sealed closing of said opening; a plurality of electrical fixtures attached within said housing; an electrical heat lamp attached to each of said electrical fixtures; a plurality of dimming switches attached to said housing; electrical circuit means connecting each of said dimming switches to an electrical power supply; said electric circuit means further electrically connecting each of said dimming switches to at least two of said electrical fixtures, whereby each of said dimming switches independently controls at least two of said electrical fixtures.

* * * * *